United States Patent Office 2,720,781
Patented Oct. 18, 1955

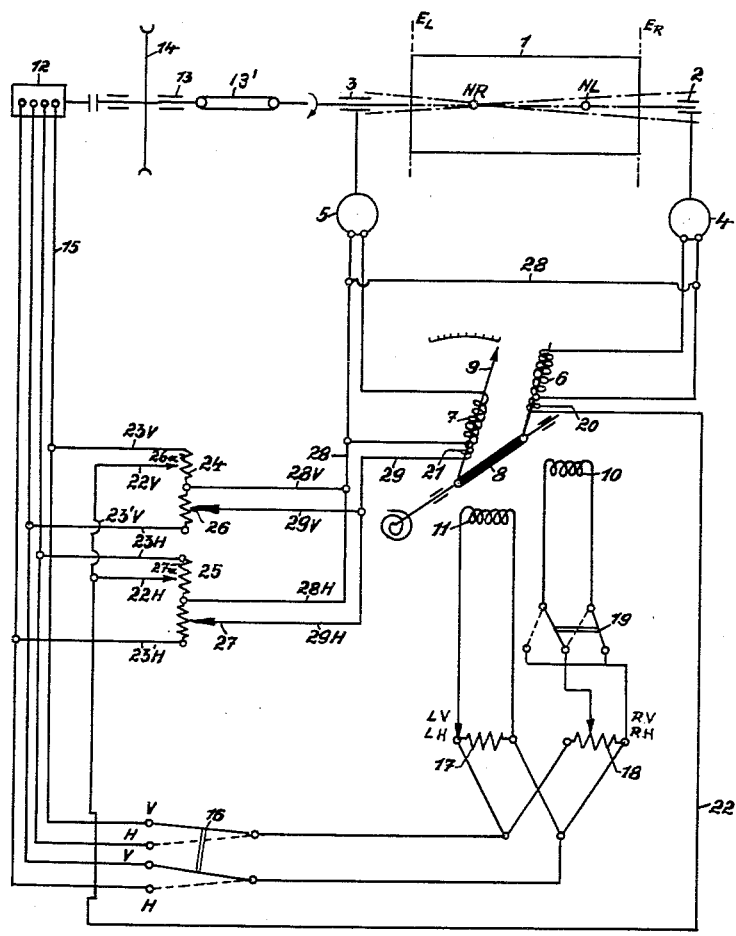

2,720,781
ROTOR BALANCING DEVICE

Klaus Federn, Darmstadt, Germany, assignor to Carl Schenk Maschinenfabrik G. m. b. H., Darmstadt, Germany, a corporation of Germany Application April 28, 1951, Serial No. 223,500

Claims priority, application Germany May 4, 1950

5 Claims. (Cl. 73—66)

My invention relates to wattmetric means for the dynamic balancing of rotating bodies, and particularly to analyzing the unbalance of a rotor by determining two coordinately directed unbalance components in each of a plurality of correction planes.

According to the known wattmetric principle of unbalance indication, two electric oscillation pickups, axially spaced along the rotating body to respond to unbalance-responsive radial oscillations of the body in two selected correction planes, translate these oscillations into respective alternating voltages which are compared in a wattmetric device with a synchronized and properly phased reference wave to effect a wattmetric indication representative of the effect of unbalance in one of the correction planes. It is thus possible to determine for each correction plane the magnitude and angular position of any corrective mass needed for eliminating the unbalance.

The electric network serving to convert the pickup oscillations into the wattmetric indication can be made to simulate a balanced rotor by introducing into each pickup circuit an alternating voltage equal but series-opposed to the pickup voltage thus compensating the unbalance effects of the rotor upon the pickup so that the wattmetric indication is zeroed. With such a zero adjustment, the balancing machinery can, more readily than otherwise possible, be adjusted and calibrated by attaching corrective weights in the correction planes.

The just-mentioned zeroing of the wattmetric indication to simulate a balanced rotor for calibrating purposes has heretofore been carried out by supplying the pickup-opposed zeroing voltages from alternators that revolve together with the rotor and are connected with the electric pickup circuits through respective transformers.

It is an object of my invention to afford a balance-simulating zeroing of the wattmetric indication without requiring the insertion of transformers, contact devices or the like members into the highly sensitive pickup-voltage circuit and without requiring additional alternators rotating synchronously with the rotor.

Another, ancillary object of the invention is to simplify and thereby improve the electric network required for analyzing the rotor unbalance into its components, so as to reduce the need for electronic amplification or, if desired, permit operating without such amplification.

It is also an object of my invention to facilitate adapting the analyzing equipment of a balancing machine to selected or otherwise given correction planes and also to facilitate balancing a body that must be mounted on an auxiliary shaft or in a cage or other revolving carrier structure during the analyzing or balancing operation.

A further object of my invention is to afford balancing a rotor of shaft-elastic properties which is subject to unbalance effects due to elastic bending when revolving at a speed within the range of operating or balancing speeds.

To achieve these objects, and in accordance with a feature of the invention, I translate the unbalance-responsive pickup voltage into a wattmetric torque, superimpose on the pickup-controlled torque a countertorque, and adjust the countertorque to the torque-balance value thus zeroing the wattmetric instrument in which the torque superposition is effected. The countertorque, according to another feature of the invention is made proportional to the revolving speed of the rotor if the pickup-controlled torque due to rotor unbalance is also proportional to that speed. Consequently, the zero adjustment of the wattmetric instrument is effected by a mechanical action within the wattmetric instrument rather than by the introduction of electric voltages into the circuit of the oscillation pickups or pickup solenoid coils.

The countertorques for compensating the unbalance indication may be produced in a wattmeter with one or two moving coils; and according to another feature of the invention, I provide each moving coil with additional windings (hereinafter called "auxiliary coil") which are supplied with alternating current of 180° phase displacement relative to the alternating pickup current traversing the normal moving coil (hereinafter called "main coil") of the instrument.

According to another feature of the invention, the correction weights for adjusting the equipment to the correction planes and for calibrating the indication with respect to these correction planes, such weights having heretofore been inserted successively into the two correction planes, may now be inserted at the same time, on radii including an angle of 90°, only one correction weight being thus located in each of the two radial planes and in each of the two axial planes. During the indication of an unbalance component only one of the two correction weights then affects the measuring result for each component direction. As a result, it can be achieved that, for adjusting the equipment to the two correction planes, only a single run is needed after the zeroing.

Furthermore, the method according to the invention may also serve for eliminating the time consuming balancing of the auxiliary shafts needed for certain types of rotors, such as fly discs and fan rotors, that must be mounted on auxiliary shafts when being balanced. To this end, the unbalance indication of the auxiliary shaft is zeroed by countertorques in the above described manner before commencing the balancing of the work piece proper. The same method is applicable for work pieces, such as crank shafts, that are to be balanced while being secured in a cage or carrier structure. Then the structure accommodating the work piece is first zeroed before mounting the work piece for balancing.

The foregoing and other objects and features of the invention will be apparent from the following description in conjunction with the drawing, showing schematically a mechanical and circuit diagram of wattmetric balancing apparatus according to the invention.

As shown, a rotor 1 to be balanced has its shaft journalled in oscillatory bearings 2 and 3 of a balancing machine. The two bearings are mechanically connected to respective electric pickups 4 and 5. The pickups may be of the known kind in which a plunger-type magnetic core, oscillating together with the bearings, moves relative to respective solenoid coils thus translating the mechanical oscillations into alternating voltages appearing across the respective coils. The coil voltages of pickups 4 and 5 are separately impressed upon the two main moving coils 6 and 7 of a double-coil wattmetric instrument. The connection of the pickups to the coils 6 and 7 is direct, that is, it does not include transformers, contacts or the like circuit elements other than the necessary leads and terminals. The wattmeter has two stationary field coils 10 and 11 in whose respective fields the moving coils 6 and 7 are located. The moving coils 6 and 7 are both mounted on the instrument shaft 8 carrying the indicating pointer 9. The two component torques of coils 6 and 7 are cumulatively directed, for instance, both tending to move the pointer in the same direction in opposition to a biasing spring. The field coils 10 and 11 receive energizing current from respective synchronous alternating-current transmitters which, in the illustrated example, consist of a two-phase alternator or sine wave generator 12, which revolves in synchronism with the rotor 1. Alternator 12 is coupled to the shaft 13 of the same belt sheave 14 that drives the rotor 1 through a Cardan joint 13'. As is well known for such alternators, the pertaining stator has two mutually perpendicular windings (not shown), or two mutually perpendicular pairs of slip ring brushes (not shown), which supply the leads 15 with two 90° phase displaced currents for the two coordinate, preferably mutually perpendicular, measuring directions in each correction plane of the rotor. For convenience, the two coordinate directions are hereinafter referred to as vertical (V) and horizontal (H) although, of course, other coordinate directions may be chosen. The two correction planes are indicated in the drawing as the right plane ($E_R$) and the left plane ($E_L$). A selector switch 16 permits switching one or the other alternator current through the two field coils 10 and 11 for selectively adjusting the equipment for one or the other of the two component directions V and H. Interposed between field coils 10, 11 and the selector switch 16 are respective potentiometer rheostats 18, 17. These rheostats serve for adjusting the strength of the electric fields to which the coils 6 and 7 are subjected, i. e. for the selective elimination of the unbalance effects upon one of the two correction planes; while a pole reversing switch 19 interposed between one of the field coils (here the field coil 10) and the pertaining potentiometer rheostat (18) permits properly poling the circuit to obtain either addition or subtraction of the torques of coils 6 and 7.

The just mentioned setting of the rheostats 17, 18 and of the pole reversing switch 19 for the purpose of calibrating the system will be more fully understood from the following. Assume that the revolving rotor is ideally balanced. Then no vibrations will occur at the two bearings 2, 3. If now an artificial unbalance is assumed to exist only in the plane $E_R$ of an otherwise ideally balanced rotor as shown on the drawing, and under the customary conditions that the balancing speed is sufficiently remote from the resonance frequency of the bearings and that there is no appreciable mechanical damping of the rotor vibrations, then the rotor will vibrate in such a manner that one point of its axis, the so-called nodal point $N_R$, remains substantially fixed in space. Under these conditions, the vibrations at the respective bearings 2 and 3 due to the artificial unbalance in plane $E_R$ are in phase or are 180° apart, the latter being the case for a rotor of the shape illustrated. The operation of phase generator 12, leads 15, switches 16 and 19 and rheostats 17 and 18 makes sure, that the alternating magnetic fields caused by the coils 10 and 11 are also in phase with each other or 180° out of phase. If now the magnetic field caused by the one field coil 10 or 11 then acting upon the moving coil 6 or 7 with the higher pickup-controlled current, is properly decreased by means of the rheostat 17 or 18 and if the switch 19 is in the proper position explained below, then the torque on pointer 9 will be nullified. Consequently, an unbalance in plane $E_R$ will not be indicated as a result of the just-described setting. The just-mentioned proper position of switch 19 is the one for nodal point $N_L$, this position being shown in full lines on the drawing. The magnetic fields of coils 10 and 11 are then in phase with each other, the currents in respective coils 6 and 7 are 180° apart. Hence, the resultant torque acting upon pointer 9 is differential and is zero if the field strengths of respective coils 10 and 11 are adjusted by means of rheostat 18 to the ratio of the vibrations at respective bearings 3 and 2.

As mentioned, an unbalance in plane $E_R$ will not be indicated with a setting just described. Consequently if there is an indication when an actual unbalance test is being made, such indication can only result from an unbalance in plane $E_L$. The indication will then represent the H-component of unbalance in plane $E_L$ if switch 16 is set to its H position, and will indicate the V-component if switch 16 is set to its V position.

In an analogous manner and by means of an artificial unbalance in plane $E_L$, the proper setting will be found at which any unbalance in plane $E_L$ is not indicated. Assume than $N_L$ is the nodal point for an artificial unbalance in plane $E_L$ and that the vibrations at bearing 3 have a larger amplitude than at bearing 2. The current then flowing through coil 6 may then be greater than the current through coil 7, and these two currents may be 180° out of phase relative to each other. For nullifying the torque then acting upon the instrument pointer, the switch 19 must be in the same position as before and rheostat 18 supplies full voltage to field coil 10, whereas rheostat 17 is set to apply to coil 11 only the fraction of the full voltage needed to null the instrument.

With this setting, the instrument will not respond to any unbalance in plane $E_L$. Consequently if there is an indication when an actual unbalance test is being made, such indication can only be due to unbalance in plane $E_R$. The indication will represent the H-component of unbalance in plane $E_R$ if switch 16 is set to its H position, and will represent the V-component if switch 16 is set to its V position.

Since any unbalance of the rigid rotor 1 can be split up in one single unbalance or two unbalance components in plane $E_L$, and in one single unbalance or two unbalance components in plane $E_R$, any other unbalance than those in planes $E_L$ and $E_R$ can be omitted from consideration.

When describing the calibration it had been assumed that the rotor was ideally balanced. If the rotor is not balanced, as for instance under service conditions, the balanced condition can be simulated by making use of the above-mentioned counter-torques.

For producing countertorques to permit mechanically zeroing the wattmetric indication of the unbalanced rotor, the wattmetric instrument is equipped with auxiliary coils 20 and 21 in addition to the main moving coils 6 and 7. The auxiliary coils are excited by mutually phase displaced voltages taken from across adjusted portions of two potentiometer rheostats 24 and 25 respectively. The rheostats are connected through leads 23V, 23'V, 23H and 23'H across the respective two phases of the alternator 12. Each rheostat has a fixed tap point and two adjustable taps or sliders 26 and 26a, or 27 and 27a. The fixed taps are interconnected by a lead 28 which is attached to one end of each auxiliary coil 20, 21 to act as a common return lead for both coils. The sliders 26a and 27a are both connected by a lead 22 to the other end of auxiliary coil 20. Both sliders 26 and 27 are connected by a lead 29 to the other end of auxiliary coil 21. The zero point of each potentiometer rheostat 24 and 25, determined by the tap point of the common lead 28, is preferably so located that positively as well as negatively phased alternating voltages can be taken from the rheostat. Consequently, the two potentiometer rheostats permit energizing the auxiliary coils by two alternating currents which are 180° phase displaced relative to the alternating currents supplied from the pickups 4 and 5 to the main moving coils 6 and 7.

The operation of the described counter-torque setting devices for mechanically zeroing the wattmetric indication, e. g. in order to allow an easy calibration of the plane setting network, will be more fully apparent from the following. As mentioned, the alternator-controlled currents through coils 10 and 11 have either the V-phase or the H-phase, depending on the selected positioning of switch 16. The pickup-controlled currents in coils 6 and 7 can have any phase angle between 0° and 360°, i. e. the pickup-controlled currents in coils 6 and 7 have components in the V-phase as well as in the H-phase. To counteract any torques by the coils 6 and 7, currents of V-phase and of H-phase in coils 20 and 21 are needed. These currents are derived from the phase-generator by the leads 15, 23V, 23'V, 23H and 23'H, and the rheostat system 24 to 27. The leads 22V, 22H, 22, and the leads 28, 28V, 28H feed the coil 20. Hence, the magnitude of the V-phase component of the current through coil 20 is controlled by the rheostat slider 26a sliding along one half of the resistance 24 between the terminals of the leads 23V and 28V. The magnitude of the H-phase of the same current is controlled by the rheostat slider 27a, sliding along one half of the resistance 25 between the terminals of leads 23H and 28H.

The leads 29 and 28 feed a counteracting current to the coil 21. The magnitude of the V-phase of this current is controlled by the setting of the rheostat slider 26 sliding along one half of the resistance 25 between the terminals of leads 28V and 23'V. The magnitude of the H-phase of the same current is controlled by the setting of the rheostat slider 27 sliding along the other half of the resistance 25 between the terminals of leads 28H and 23'H.

It will be understood that any unbalance effect of the rotor upon the pointer 9 because of currents in the coils 6 and 7 can be nullified simply by setting the sliders 26a, 27a and 26, 27 until any torque on pointer 9 effected by coils 20 and 21 disappears at any of the four measuring positions. This is done by setting the sliders 26a and 26 while switch 16 is in the position V, and by setting the sliders 27a and 27 while switch 16 is in the position H. Sliders 26a and 27a are moved for nullifying the influence of vibrations at bearing 2, and sliders 26 and 27 are moved for nullifying the influence of vibrations at bearing 3. This moving may be done most systematically in a position of the plane selecting device 17, 18, 19 in which either coil 11 or coil 10 is not energized. That is, when slider 26a or 27a is being set, no current should flow through coil 11; and when slider 26 or 27 is being set, no current should flow through coil 10. When thus the current in one field coil of the double-coil instrument is adjusted to the full value while the current in the other field coil is brought to the zero value, then only the unbalance-responsive oscillations at one bearing side of the rotor can cause the pertaining pickup voltage to produce a torque effective upon pointer 9.

For further elucidating the operation of the apparatus, an example of instructions will now be given for balance testing a rotor of unknown unbalance.

First place the rotor of unknown unbalance in bearings 2 and 3. Connect the rotor to the universal joint 13' of shaft 13. Start the machine drive and run the rotor up to balancing speed. The apparatus is now ready for zeroing operation.

Place switch 16 in position V. Set rheostat 17 to full field for coil 11, and rheostat 18 to zero field for coil 10. Place switch 19 in the position shown in full lines. Now, obviously, only vibrations of bearing 3 will influence pointer 9, since coil 6 is moving in a field of zero strength and therefore produces no torque. Now nullify the pointer indication by moving tap 26, on rheostat 24, starting at the middle point (connecting point to lead 28V), toward end lead 23V or 23'V, depending upon which movement causes the pointer indication to decrease. Stop moving the tap 26 when pointer 9 reaches zero. Thereafter, place switch 16 to the H-position and move tap 27 toward lead 23H or 23'H of rheostat 25 until pointer 9 again stands at zero. Leave the taps 26 and 27 in the positions thus set.

Place rheostat 17 to zero field for coil 11, and place rheostat 18 to full field for coil 10. Now, only currents through coils 6 and 20 can produce torques because coils 7 and 21 are moving in a field of zero value. Consequently, only vibrations of bearing 2 are indicated. Leave switch 16 in the H-position and displace tap 27a to the point at which pointer 9 shows zero. Then place switch 16 in the V-position and shift tap 26a until the pointer indication is again zero. Thereafter leave taps 26a and 27a in the positions thus set.

The taps 26, 27 and 26a, 27a now have the setting at which the vibration-responsive current in the main moving coil 6 or 7 is balanced by a counter-acting current in compensating coil 20 or 21. If necessary, this setting may be checked or corrected by a second nullifying run, going again through all four described setting-combinations of elements 16, 17 and 18. The result of the nullifying operation is satisfactory when the deflection of pointer 9 on the instrument scale remains below a given value (for instance, of not more than ±1 scale divisions of a center-zero 100-division scale) for each of the four combinations of settings:

|   | Switch 16 in position | Rheostat 17 on | Rheostat 18 on |   |
|---|---|---|---|---|
| (1) | V | full | zero | (Setting LV.) |
| (2) | H | full | zero | (Setting LH.) |
| (3) | V | zero | full | (Setting RV.) |
| (4) | H | zero | full | (Setting RH.) |

After the completion of the nullifying operation, the indication, being zero for all four unbalance components, simulates a perfectly balanced rotor so that the apparatus is ready for the calibrating run.

Now stop the rotor. Add an artificial unbalance $U_{LV}$ of known weight (in grams or ounces) in plane $E_L$ in the V-direction, that is, on that radius where the added weight $U_{LV}$ will not cause an indication when switch 16 is in position-H. Add another artificial unbalance $U_{RH}$ of known weight in plane $E_R$ in the H-direction, that is, the direction in which the weight $V_{RH}$ will cause no reading when switch 16 is in position-V. Then bring the rotor again up to balancing speed.

Now the switches 16, 19 and the rheostats 17, 18 can be set to four different combinations of settings in which the pointer 9 can respond, respectively, only to the V-component of unbalance in plane $E_L$ (setting LV), the H-component of unbalance in plane $E_L$ (setting LH), the V-component in plane $E_R$ (setting RV), and the H-component in plane $E_R$ (setting RH). However, since artificial unbalances have been added only in plane $E_L$ in the coordinate direction V and in plane $E_R$ in direction H, the instrument pointer is now supposed to deflect from zero only with settings LV and RH but not with settings LH and RV. To check this, proceed as follows:

Establish setting LH; that is, place switch 16 on H, rheostat 17 on full, and rheostat 18 on zero. Pointer 9 is not supposed to deflect from the zero midpoint of the scale. If it does, move the tap of rheostat 18 and place switch 19 to such a position that the indication becomes zero. Then check the setting RV by placing switch 16 on V, rheostat 18 on full, and rheostat 17 on zero. If pointer 9 deflects from zero, place the tap of rheostat 17 and switch 19 to such positions that pointer 9 is zeroed. Note that the settings LH and LV have the same positions for parts 17, 18 and 19 but different settings of switch 16 (the same being true for settings RV and RH).

When settings LH and LV are thus checked and corrected, switch over to setting LV. With this setting, the pointer will show a reading caused only by the known unbalance $U_{LV}$. For calibrating the instrument scale, divide the weight value (in grams or ounces) of $U_{LV}$ by the indicated scale divisions, and keep in mind or on paper the weight calibration thus obtained for plane $E_L$. Then switch to setting RH to obtain a reading caused only by weight $U_{RH}$. Divide the known weight of $U_{RH}$ by the indicated scale divisions, and keep in mind or on paper the calibration thus obtained for plane E_R. This completes the calibrating procedure.

Now place the taps 26, 27, 26a, 27a off the rheostats 24, 25; and then repeat placing the switch 16 and the rheostats 17, 18 sequentially into the four combinations of settings $L_V$, $L_H$, $R_V$, $R_H$. With each of these settings, the instrument pointer 9 indicates the corresponding component of the total unbalance in the rotor and thus shows, by reference to the weight calibration, the amounts of correction to be made (in addition to the artificial unbalances).

Thus the balancing of a rotor of a completely unknown unbalance can be effected with only two runs of the rotor.

It will be recognized that the adjustment of the electric unbalance-analyzing system is effected by varying the magnetic field strength in the two torque-producing systems of the indicating instrument. The torques caused by the ampere windings of the auxiliary coils 20 and 21 are influenced in the same manner. Conesquently, once the system is properly zeroed the zero adjustment is not affected by subsequent changes or fluctuations of the magnetic field strengths, and the original unbalance of the rotor can not make itself felt because it is always compensated by the effects of the auxiliary coils.

While the currents in the main coils 6 and 7 are in the order of magnitude of a few microamperes, these coils can withstand a load one-hundred times as high, i. e. a load in the order of milliamperes. Currents of the latter magnitude can readily be taken from the alternator 12 whose current capacity may well be a further one-hundred times higher. Consequently, each auxiliary coil 20 and 21 may be limited to relatively few winding turns. In certain cases it may be of advantage to insert transformers into one or both of the circuits 22—23 and 28—29.

In the illustrated apparatus, as explained, the wattmetric instrument receives, through the adjusting rheostats 24 and 25, alternating voltages in each auxiliary coil for the measuring positions of the four unbalance components ($L_V$, $L_H$, $R_V$, $R_H$). In this manner, the unbalance-responsive torque imposed upon the pointer shaft 8 in each measuring position is compensated by a countertorque of the auxiliary coil thus simulating an already balanced rotor. Since it is sometimes desired to retain this compensation when changing the rotary speed, and since the pickups 4 and 5 provide a voltage about proportional to the rotary speed, the same speed-proportional characteristic must also be required for the voltages impressed upon the auxiliary coils and hence for the voltage of the alternator. For the balancing of rotors mounted on auxiliary shafts or in a rotating cage or carrier of the balancing machine, any unbalance inherent in the auxiliary structure is first zeroed by countertorques in the wattmetric instrument. During the subsequent balancing operation proper the wattmeter then indicates only the unbalance of the work piece.

For balancing a rotor in three correction planes, as is necessary with shaft-elastic bodies, for instance, Cardanic shafts, when the body is to run smoothly not only at a single revolving speed but within a larger speed range including, or near, the fundamental critical speed of bending oscillations, the invention can be used to advantage for indicating the bending deformation of such a body. Such an indication is obtained as follows: At first, the countertorques are adjusted as described in the foregoing for zeroing the wattmeter indication while revolving the body at a relatively low speed at which the body is rigid. Then the speed is increased over the desired range. At the higher speeds, the zero indication will persist as long as the body remains rigid. Hence, when now an off-zero indication of the instrument occurs, this indication can originate only from bending deformation of the body and is a measure of such deformation. Consequently, the necessary correction masses can then be added to reduce or eliminate that deformation. These correction masses consist of three weights, one located at a central longitudinal position along the rotor at a point opposite the direction of bending deformation, and the other two being located one each in line with the two end bearings of the rotor and at 180° angular displacement with respect to the central weight. The magnitude of the central weight is such as ascertained by test to eliminate unbalance due to bending deformation of the rotor, while the magnitudes of the end weights are such as, together with the central weight, will not affect the dynamic balance of the rotor. Thus, if the end weights are placed at the same radial distance from the axis of rotation of the rotor, then each will have one-half the weight value of the central weight.

It will be obvious to those skilled in the art, upon a study of this disclosure, that the invention permits various and diversified modifications, especially as regards mechanical details and electrical components of the unbalance-analyzing equipment, and hence may be carried out by means other than those specifically shown and described, without departing from the essence of my invention and within the scope of the claims annexed hereto.

I claim:

1. Apparatus for analyzing unbalance of rotors by determining two coordinately directed unbalance components in each of a plurality of correction planes, comprising oscillation pickups responsive to rotor unbalance in said respective correction planes to provide respective alternating voltages, a wattmetric instrument having a revolvable indicator member and having a pair of field coils and a pair of moving coils, said moving coils being disposed in the respective fields of said field coils and being mounted on said member to impose respective voltage-responsive torques thereon, said pair of moving coils being electrically connected with said respective pickups so as to respond to the pickup voltages, two alternating-current supply means of respective voltages synchronous with the rotor speed and phased 90° with respect to each other, selector switch means connecting a selected one of said coils of said pair of field coils to a selected one of said current-supply means, said instrument having two compensating coils in torque opposition to said respective voltage-responsive torques, and two circuit means adjustable in phase and current magnitude and connecting said respective compensating coils with said alternating-current supply means.

2. Apparatus for analyzing unbalance of rotors by determining two coordinately directed unbalance components in each of a plurality of correction planes, comprising oscillation pickups responsive to rotor unbalance in said respective correction planes to provide respective alternating voltages, a wattmetric instrument having an indicator shaft, said instrument having two field coils and having two moving coils mounted on said shaft and disposed in the fields of said respective field coils, said moving coils being individually connected with said pickups to impose respective torques on said shaft in response to the respective voltages of said two pickups, two alternating-current supply means of mutually phase displaced voltages synchronous with the rotor speed, selectively settable switch means connecting said field coils with a selected one of said current supply means, said instrument having two compensating coils for producing respective countertorques in opposition to said voltage-responsive torques, and two phase-adjustable electric circuits connecting each of said compensating coils with said two current supply means and comprising rheostat means for individually adjusting said countertorques to balance said voltage-responsive torques.

3. Apparatus for analyzing unbalance of rotors by determining two coordinately directed unbalance components in each of a plurality of correction planes, comprising oscillation pickups responsive to rotor unbalance in said respective correction planes to provide respective alternating voltages, a wattmetric instrument having an indicator shaft and comprising two stationary field coils and two pairs of moving coils mounted on said shaft and disposed in the fields of said respective field coils, each of said pairs of moving coils having a main coil and an auxiliary coil, each of said main coils being electrically connected to one of said respective pickups to impose on said shaft a torque responsive to the voltage of said one pickup, two alternating-current supply means of mutually phase-displaced voltages synchronous with the rotor speed, selector switch means connecting said field coils with a selected one of said current supply means, said two auxiliary coils being connected with said respective current supply means to impose on said shaft respective countertorques in opposition to said pickup-responsive torques, and current control means interposed between said current supply means and said respective auxiliary coils for individually adjusting said countertorques to balance said voltage-responsive torques.

4. In apparatus according to claim 3, said current control means comprising two potentiometer rheostats connected across said respective current supply means, each of said rheostats having a fixed intermediate zero-potential point and having two displaceable taps on opposite sides respectively of said point, said two zero-potential points being connected with each other and with one end of each of said two auxiliary coils, one tap of each rheostat being connected with one tap of the other rheostat and with the other end of one of said auxiliary coils, the other taps of said two rheostats being connected with each other and with the other end of said other auxiliary coil.

5. Apparatus for analyzing unbalance of rotors by determining two coordinately directed unbalance components in each of two correction planes, comprising oscillation pickups responsive to rotor unbalance in said respective correction planes to provide respective alternating voltages, a wattmetric instrument having an indicator shaft and comprising two stationary field coils and two pairs of moving coils mounted on said shaft and disposed in the fields of said respective field coils, each of said pairs having a main coil and an auxiliary coil, synchronous current source means having two supply circuits of mutually phase-displaced voltages synchronous with the rotor revolution, selector switch means having a total of four positional adjustments and connecting in each two of said adjustments said field coils with one of said two circuits respectively, said main coils being connected with said respective pickups to impose on said shaft two torques responsive to the respective pickup voltages, and two circuit means connecting said supply circuits with said respective auxiliary coils to impose on said shaft respective countertorques opposed to said voltage-responsive torques, each of said circuit means having a control member for individually adjusting each of said countertorques to the balance value to thereby set said instrument for indication of one of said unbalance components in a selected one of said correction planes.

References Cited in the file of this patent
UNITED STATES PATENTS

| | | |
|---|---|---|
| 2,315,998 | Haeger | Apr. 6, 1943 |
| 2,363,373 | Werner | Nov. 21, 1944 |
| 2,487,035 | Weaver et al. | Nov. 1, 1949 |
| 2,500,013 | Svensson et al. | Mar. 7, 1950 |
| 2,551,480 | Whitney | May 1, 1951 |